US010791538B1

(12) United States Patent
Saraf et al.

(10) Patent No.: US 10,791,538 B1
(45) Date of Patent: Sep. 29, 2020

(54) CLOUD-BASED DATA SYNCHRONIZATION

(75) Inventors: Suman Saraf, Gurgaon (IN); David P. Reese, Jr., Sunnyvale, CA (US); Harvinder Singh Sawhney, Gurgaon (IN); Shashi Kant Sharma, Gurgaon (IN)

(73) Assignee: BlueStack Systems, Inc., Campbell, CA (US)

( * ) Notice: Subject to any disclaimer, the term of this patent is extended or adjusted under 35 U.S.C. 154(b) by 227 days.

(21) Appl. No.: 13/543,052

(22) Filed: Jul. 6, 2012

Related U.S. Application Data

(60) Provisional application No. 61/504,978, filed on Jul. 6, 2011, provisional application No. 61/504,983, filed on Jul. 6, 2011.

(51) Int. Cl.
*H04W 68/00* (2009.01)
(52) U.S. Cl.
CPC .................................. *H04W 68/00* (2013.01)
(58) Field of Classification Search
CPC ........................................................ G06F 3/00
USPC ......................................................... 709/223
See application file for complete search history.

(56) References Cited

U.S. PATENT DOCUMENTS

| 7,647,491 | B2 | 1/2010 | Kawano et al. | |
|---|---|---|---|---|
| 7,987,432 | B1* | 7/2011 | Grechishkin | ......... G06F 9/4443 715/769 |
| 8,117,554 | B1 | 2/2012 | Woodward | |
| 8,161,275 | B1 | 4/2012 | Woodward | |
| 8,438,375 | B1 | 5/2013 | Woodward | |
| 8,819,202 | B1* | 8/2014 | Carolan et al. | ............... 709/223 |
| 2003/0140313 | A1* | 7/2003 | Smith | .................. G06F 16/335 715/255 |
| 2005/0114870 | A1 | 5/2005 | Song et al. | |
| 2005/0149922 | A1* | 7/2005 | Vincent | ..................... G06F 8/67 717/172 |
| 2008/0083036 | A1* | 4/2008 | Ozzie | .................. H04L 63/0428 726/27 |
| 2008/0133903 | A1 | 6/2008 | Sun et al. | |
| 2008/0215672 | A1* | 9/2008 | Kloba | ..................... H04W 4/00 709/203 |
| 2008/0216071 | A1 | 9/2008 | Gidalov | |

(Continued)

OTHER PUBLICATIONS

Mark Wilson, 'Steam comes to Mac, Offers Cross-Platform Gaming Free of Charge', Mar. 8, 2010.*

*Primary Examiner* — Tonia L Dollinger
*Assistant Examiner* — Ishrat Rashid
(74) *Attorney, Agent, or Firm* — The Webb Law Firm

(57) ABSTRACT

Embodiments of the present invention are directed to cloud-based data synchronization. Two or more devices associated with an account in a cloud can be synched. The account is configured to manage publishing and subscription relationships between these devices such that a first device is able to publish data to the account in the cloud, and a second device is able to subscribe to the data from the account. In some embodiments, the account is configured to determine whether the second device has proper dependencies for subscribing to the data, and to prevent the second device from subscribing to the data upon determining that the second device does not have proper dependencies. However, in some embodiments, proper dependencies are automatically satisfied by downloading and installing a tool configured to properly process the data (e.g., execute applications) on the second device.

27 Claims, 9 Drawing Sheets

(56) References Cited

U.S. PATENT DOCUMENTS

| | | | |
|---|---|---|---|
| 2010/0199037 A1* | 8/2010 | Umbehocker | G06F 9/5072 711/113 |
| 2011/0016299 A1 | 1/2011 | Galicia et al. | |
| 2011/0035355 A1* | 2/2011 | Sagar et al. | 707/610 |
| 2011/0082900 A1 | 4/2011 | Nagpal et al. | |
| 2011/0110315 A1* | 5/2011 | Chen | H04L 5/0053 370/329 |
| 2011/0126216 A1 | 5/2011 | Galicia et al. | |
| 2011/0276621 A1 | 11/2011 | Edery et al. | |
| 2011/0302630 A1* | 12/2011 | Nair | G06F 21/41 726/4 |
| 2012/0011513 A1 | 1/2012 | McConaughy et al. | |
| 2012/0023507 A1* | 1/2012 | Travis | 719/319 |
| 2012/0042159 A1 | 2/2012 | Liu | |
| 2012/0066675 A1* | 3/2012 | Shelansky | G06F 9/44526 717/178 |
| 2012/0079095 A1* | 3/2012 | Evans | G06F 16/27 709/224 |
| 2012/0086716 A1 | 4/2012 | Reeves et al. | |
| 2012/0089906 A1 | 4/2012 | Reeves et al. | |
| 2012/0089992 A1 | 4/2012 | Reeves et al. | |
| 2012/0110315 A1* | 5/2012 | Lee | G06F 9/45558 713/100 |
| 2012/0110496 A1 | 5/2012 | Lee et al. | |
| 2012/0143900 A1 | 6/2012 | Ainslie et al. | |
| 2012/0191961 A1 | 7/2012 | Wu et al. | |
| 2012/0197968 A1* | 8/2012 | Korovin | G06F 9/5072 709/203 |
| 2012/0216181 A1 | 8/2012 | Arcese et al. | |
| 2012/0303476 A1* | 11/2012 | Krzyzanowski | G06F 8/60 705/26.5 |
| 2012/0324434 A1* | 12/2012 | Tewari | G06F 8/60 717/168 |
| 2012/0331177 A1* | 12/2012 | Jensen | H04L 67/1095 709/248 |
| 2013/0024778 A1 | 1/2013 | Reeves et al. | |
| 2013/0047150 A1 | 2/2013 | Malasky et al. | |
| 2013/0054952 A1 | 2/2013 | Shen | |
| 2013/0074069 A1 | 3/2013 | Li | |
| 2013/0095785 A1 | 4/2013 | Sadana et al. | |
| 2013/0139182 A1 | 5/2013 | Sethuraman et al. | |
| 2013/0268397 A1 | 10/2013 | Mehta et al. | |
| 2014/0007222 A1 | 1/2014 | Qureshi et al. | |

\* cited by examiner

CLOUD-BASED DATA SYNCHRONIZATION

RELATED APPLICATIONS

This application claims benefit of priority under 35 U.S.C. section 119(e) of the U.S. Provisional Patent Application Ser. No. 61/504,983, filed Jul. 6, 2011, entitled "Application Test Drive," and U.S. Provisional Patent Application Ser. No. 61/504,978, filed Jul. 6 2011, entitled "Cloud-Based App Sync," which are both hereby incorporated by reference in their entirety.

FIELD OF THE INVENTION

The present invention is related to the field of synchronization. More specifically, the present invention relates to cloud-based data synchronization.

BACKGROUND OF THE INVENTION

A marketplace is an online digital distribution center that delivers content to devices over a network. A marketplace can be an established application store, such as Google Apps Marketplace or Apple's AppStores, or can be provided by a mobile carrier, such as AT&T or Verizon. Application developers typically publish developed applications in the marketplace for users to subscribe to. Users typically are not allowed to push any data to the marketplace. FIG. 1 illustrates a system 100 for delivery of content. The system 100 includes a marketplace 105 and a plurality of devices 110a, 110b. The plurality of devices 110a, 110b are coupled to the marketplace 105 for user(s) of these devices 110a, 110b to retrieve applications published by application developers onto these devices 110a, 110b. If a user wishes to have an application, such as Angry Birds Space, running on each device 110a, 110b, the user may separately download Angry Birds Space from the marketplace 105 on the devices 110a, 100b. For example, in FIG. 1, the user's tablet 110a connects with and downloads Angry Birds Space from the marketplace 105. Similarly, the user's smart phone 110b connects with and downloads Angry Birds Space from the marketplace 105. This process involves repeatedly visiting the marketplace 105. In addition, if Angry Birds Space was removed, either intentionally or accidentally, from the tablet 110a, and the user wants to have Angry Birds Space running on the tablet 110a again, the user would need to yet again visit the marketplace 105 to download Angry Birds Space from the marketplace 105 onto the tablet 110a.

What is needed is an ability for a user to synch data, including applications, across a plurality of devices.

SUMMARY OF THE INVENTION

Embodiments of the present invention are directed to cloud-based data synchronization. Two or more devices associated with an account in a cloud can be synched. The account is configured to manage publishing and subscription relationships between these devices such that a first device is able to publish data to the account in the cloud, and a second device is able to subscribe to the data from the account. In some embodiments, the account is configured to determine whether the second device has proper dependencies for subscribing to the data, and to prevent the second device from subscribing to the data upon determining that the second device does not have proper dependencies. However, in some embodiments, proper dependencies are automatically satisfied by downloading and installing a tool configured to properly process the data (e.g., execute applications) on the second device. In some embodiments, the tool is the BlueStacks™ application player.

In one aspect, a non-transitory computer-readable medium is provided. The non-transitory computer-readable medium stores instructions that, when executed by a computing device, cause the computing device to perform a method. The method includes creating a user account in a cloud, pairing a secondary device with the account in the cloud, and managing publishing and subscription relationships between the primary device and the secondary device.

In some embodiments, the secondary device is paired with the account via a shared secret, such as a pin. In some embodiments, the secondary device is paired with the account via public key cryptography, such as a certificate exchange. Other pairing mechanisms are contemplated.

In some embodiments, managing publishing and subscription relationships includes synching data between the primary device and the secondary device. In some embodiments, synching data includes publishing data from one of the primary device and the secondary device, and subscribing to the data from the other device.

In some embodiments, managing publishing and subscription relationships includes determining whether the primary device has proper dependencies for subscribing to data, wherein the data is published by the secondary device and, based on the determination, automatically satisfying the proper dependencies.

In another aspect, a method of synching two devices associated with an account in a cloud is provided. The method includes publishing data to the account in the cloud from a source device while the source device is communicatively coupled with the cloud, and subscribing to the data from the target device while the target device is communicatively coupled with the cloud.

The source device and the target device can support the same operating system. The source device, the target device or both can support a guest operating system. In some embodiments, the data includes an application, a phone book, a calendar, SMS messages, email, memos, a photo/video album, documents, folders or a combination thereof.

In some embodiments, the method further includes pairing the source device with the account in the cloud, publishing one or more selected applications to the cloud from the source device, and subscribing to the one or more selected applications from the target device. In some embodiments, subscribing to the one or more applications includes downloading and installing an application player on the target device, wherein the application player supports the same operating system as the source device. In some embodiments, subscribing to the one or more applications includes downloading the one or more applications in an appropriate operating system supported by the target device. The one or more applications can be automatically downloaded in an appropriate operating system.

In some embodiments, the method further includes obtaining an application on the source device, publishing the application to the cloud from the source device, and subscribing to the application from the target device. In some embodiments, obtaining an application includes using an application broker that is configured to interface with at least one application source to retrieve the application therefrom. In some embodiments, the application is specific to a guest operating system, and the application is configured to run in the application player associated with the guest operating system. In some embodiments, the application player is auto-configured to communicatively couple with the cloud.

The guest operating system can be the same as or different from the host operating system of the source device. In some embodiments, subscribing to the application includes pairing the target device with the account in the cloud. In some embodiments, the method further includes, before publishing the application, evaluating the application on the source device, and performing a purchase workflow to buy the application.

In yet another aspect, a system for synching a plurality of devices is provided. The system includes a plurality of devices. Each device is configured to communicatively couple with a cloud. The system includes an account in the cloud. At least a portion of the plurality of devices is associated with the account in a cloud. The account is typically configured to manage publishing and subscription relationships between each associated device.

In some embodiments, the account is configured to prevent an associated device from subscribing applications upon determining that the associated device does not have proper dependencies.

In some embodiments, the account is configured to allow a first associated device to publish data to the cloud and a second associated device to subscribe to the data from the cloud. In some embodiments, the second associated device has proper dependencies for subscribing to the data.

In some embodiments, the account is configured to properly manage rights for applications.

In some embodiments, at least one associated device is configured to support a host operating system and a guest operating system. In some embodiments, at least one associated device is configured to communicatively couple with an application marketplace.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the present invention are directed to cloud-based data synchronization. Two or more devices associated with an account in a cloud can be synched. The account is configured to manage publishing and subscription relationships between these devices such that a first device is able to publish data to the account in the cloud, and a second device is able to subscribe to the data from the account. In some embodiments, the account is configured to determine whether the second device has proper dependencies for subscribing to the data, and to prevent the second device from subscribing to the data upon determining that the second device does not have proper dependencies. However, in some embodiments, proper dependencies are automatically satisfied by downloading and installing a tool configured to properly process the data (e.g., execute applications) on the second device. In some embodiments, the tool is the BlueStacks™ application player.

The BlueStacks™ application player is disclosed in the co-pending application Ser. No. 13/479,086, entitled "Apparatuses, Systems and Methods of Switching Operating Systems," filed on May 23, 2012, and in the co-pending application Ser. No. 13/479,056, entitled "Application Player," filed on May 23, 2012, which are hereby incorporated by reference.

Overview

Figure 1:
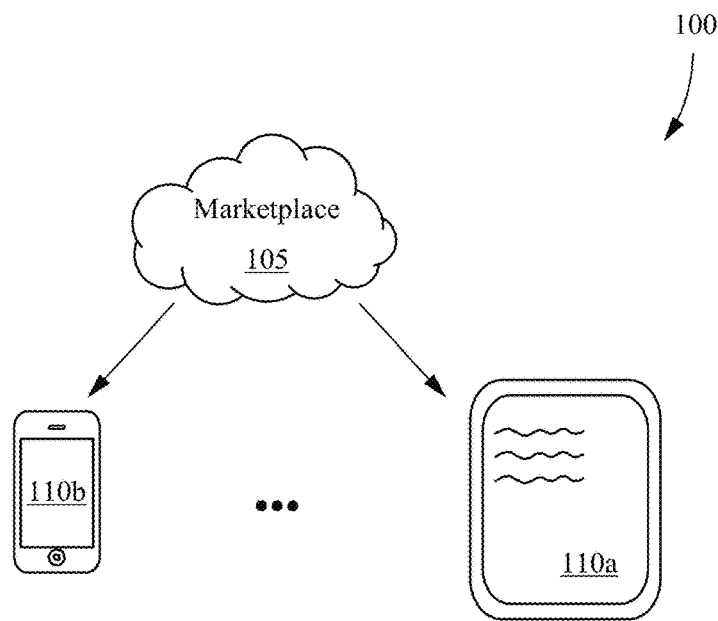
FIG. 1 illustrates a system for delivery of content.
Figure 2:
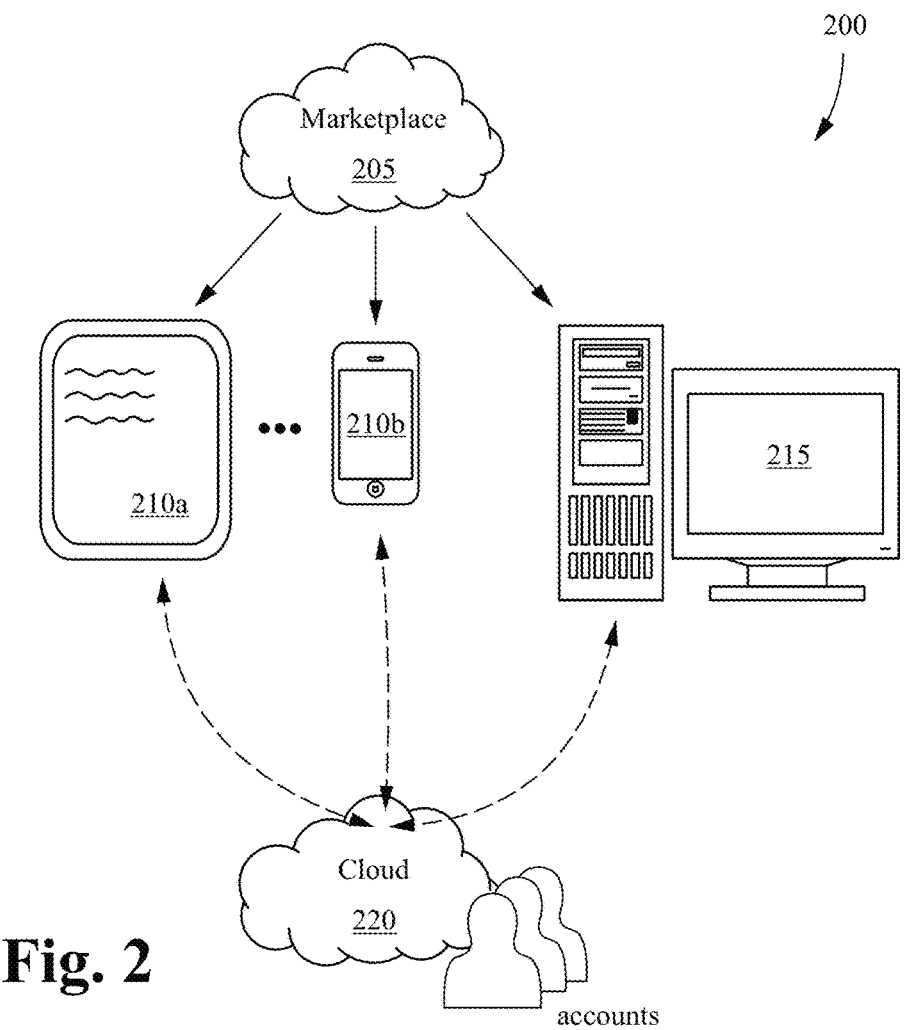
FIG. 2 illustrates an exemplary system for synching data across devices in accordance with the present invention.

FIG. 2 illustrates an exemplary system 200 for synching data across devices in accordance with the present invention. The system 200 includes a marketplace 205, a plurality of devices 210-215, and BlueStacks™ cloud service hosted in the cloud 220. The marketplace 205 is similarly configured as the marketplace 105. Each device 210-215 can be communicatively coupled with the marketplace 205 when retrieving applications published by application developers. Assume the devices 210-215 belong to or are otherwise accessible by a user, and the user wants to synch data across the devices 210-215. The user is able to utilize the cloud service to synch data across the devices 210-215 via the cloud 220. Although, each of the devices 210-215 shown is different, the user is able to synch data across similar devices, e.g., PC to PC sync or phone to phone sync. Typically, the user creates an account in the cloud 220 and associates the devices 210-215 with the account. Any of the associated devices is capable of being synched. Each device 210-215 can support one or more operating systems, which may be the same or different from the other operating systems supported by the other devices 210-215. For example, the tablet 210*a* is an Apple iPad, the mobile phone 210*b* is an Android phone, and the computer 215 is a Windows 7 PC. For another example, the computer 215 supports a guest Android operating system. Although only three devices are shown in FIG. 2, other special purpose devices, such as set top boxes and automobile consoles to name a couple, can also be associated with the account for synchronization.

In some embodiments, each device must be associated with an account in the cloud that the device is sending data to and/or receiving data from. Put differently, a device is preferably only able to access an account that the device is associated with. Alternatively, a device is able to subscribe to data from any account if given the permission to do so. A device is a source device when it is publishing data to the cloud. A device is a target device when it is subscribing to data from the cloud. Data includes, but is not limited to, applications, phone book, calendar, SMS messages, email, memo, a photo/video album, documents, files and another other suitable data. In some embodiments, the account is configured to properly manage intellectual property rights of applications, including copyrights.

Figure 3A:
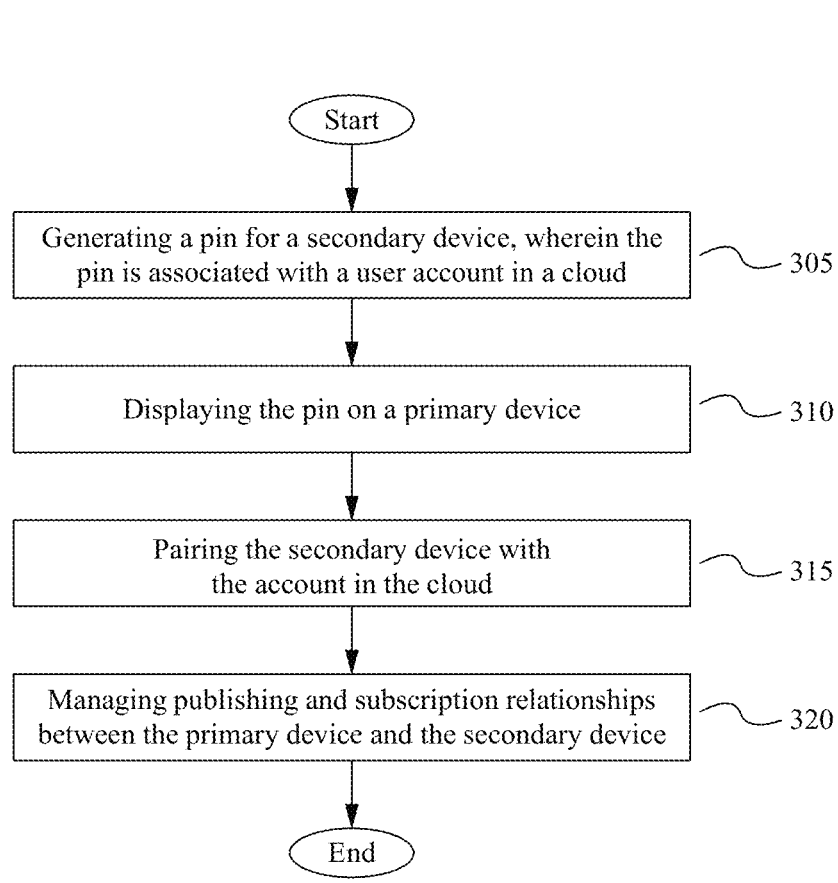
FIG. 3A illustrates an exemplary method of enabling publishing and subscription of data in accordance with the present invention.

FIG. 3A illustrates an exemplary method 300 of enabling publishing and subscription of data in accordance with the present invention. Assume (1) a user has already created an account in the cloud, (2) a primary device is already associated with the account, and (3) the user has requested that a secondary device be associated with the account. In some embodiments, the user's account is configured to perform the method 300. The method 300 begins at a step 305, where a unique pin for a secondary device is generated. The pin associates the user's account in the cloud with the secondary device.

At a step 310, the pin is shown to the user. In some embodiments, the pin is displayed on the primary device.

At a step 315, the secondary device is paired with the account in the cloud upon correctly providing the pin from the secondary device to the cloud. Although pairing via a pin is discussed in this example, other pairing techniques are contemplated including, but are not limited to, use of other shared secrets and use of public key cryptography, such as a certificate exchange.

At a step 320, publishing and subscription relationships between the primary device and the secondary device are managed. Typically, the user's account intelligently manages these relationships. In some embodiments, managing the relationship includes synching data between the primary device and the secondary device. In some embodiments, managing the relationship includes determining whether the primary device has proper dependencies for subscribing data published by the secondary device and, based on the determination, automatically satisfying the proper dependencies. Satisfying proper dependencies for synching is discussed elsewhere. After the step 320, the method 300 ends.

Figure 3B:
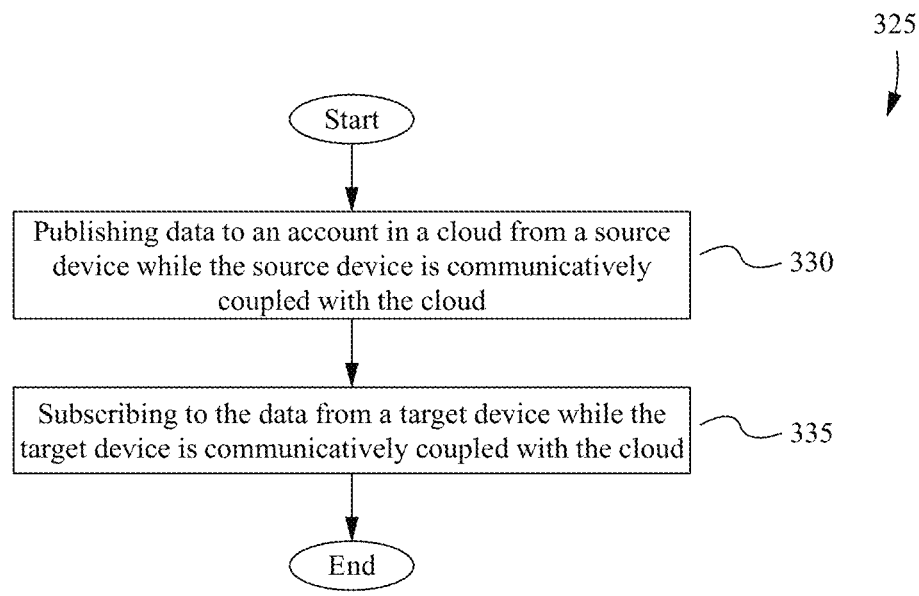
FIG. 3B illustrates an exemplary method of retrieving data from a cloud in accordance with the present invention.

FIG. 3B illustrates an exemplary method 325 of retrieving data from the cloud in accordance with the present invention. The method 325 begins at a step 330, where data is published to an account in the cloud from a source device while the source device is communicatively coupled with the cloud. Typically, the source device is associated with the account. In some embodiments, the data to be published to the cloud is determined by the user. Alternatively, the data to be published is automatically determined by the account, the source device, or both. After the data is published, the source device no longer needs to be but can remain communicatively coupled with the cloud. In some embodiments, the user is able to select one or more target devices to receive the data. In some embodiments, the account is configured to resolve conflicts during the transfer of the data from the source device to the cloud.

At a step 335, the data is subscribed to a target device while the target device is communicatively coupled with the cloud. Typically, the target device is associated with the account. In some embodiments, the source device and the target device support the same operating system. Alternatively, the source device and the target device do not support the same operating system. In some embodiments, the data is automatically retrieved and downloaded onto the target device upon coupling with the cloud. Alternatively or in addition to, user intervention is required to start, stop, and/or continue the transfer from the cloud to the target device. In some embodiments, the user is able to indicate which data to subscribe to. After the data is subscribed, the target device no longer needs to be but can remain communicatively coupled with the cloud. In some embodiments, the account is configured to resolve conflicts during the transfer of the data from the cloud to the target device. After the step 335, the method 325 ends.

Figure 4:
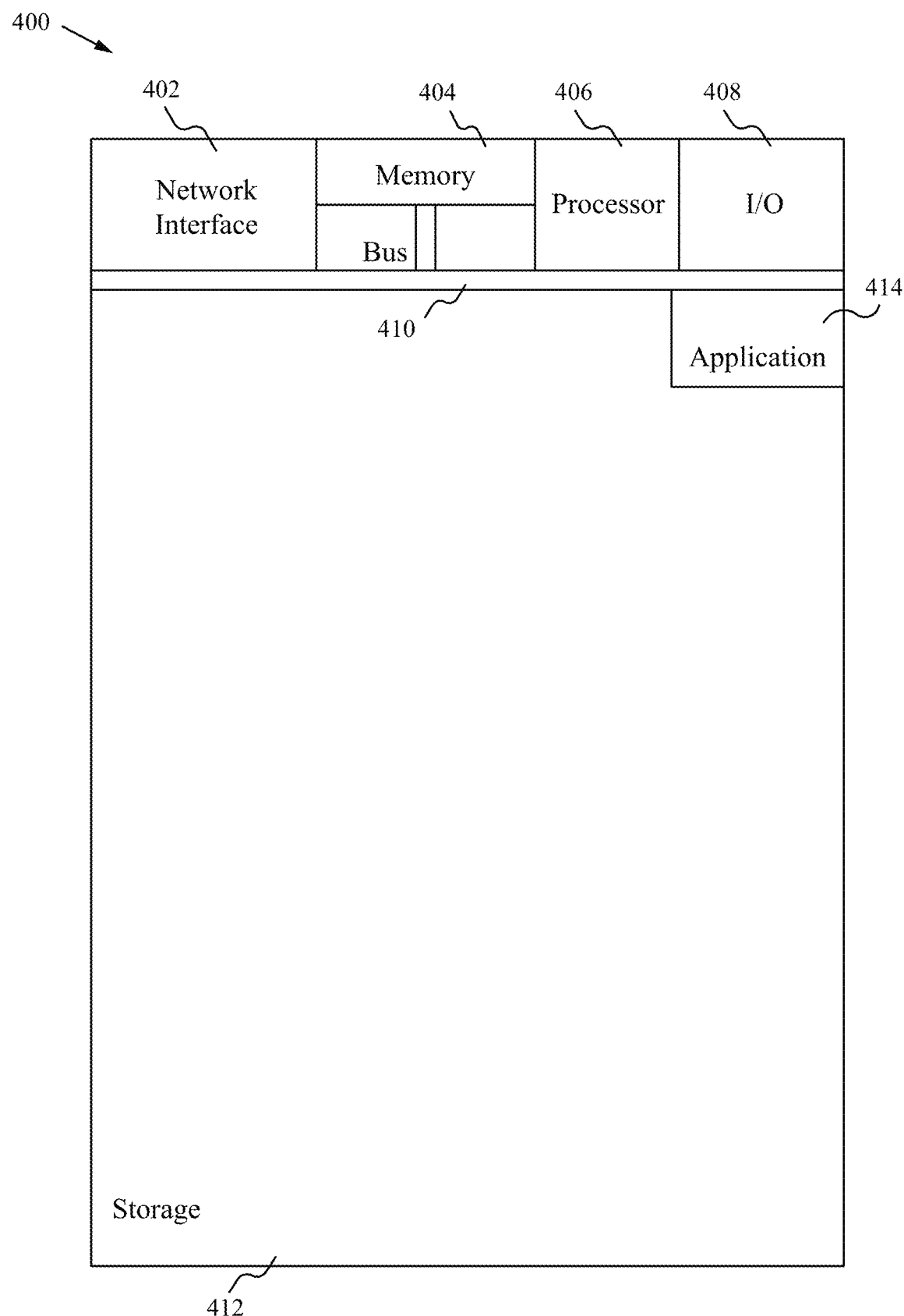
FIG. 4 illustrates a block diagram of an exemplary computing device in accordance with the present invention.

FIG. 4 illustrates a block diagram of an exemplary computing device 400 in accordance with the present invention. The computing device 400 is able to be used to acquire, cache, store, compute, search, transfer, communicate and/or display information. For example, the computing device 400 is able to communicatively couple with a cloud, such as the cloud 220, to synch with one or more other devices.

In general, a hardware structure suitable for implementing the computing device 400 includes a network interface 402, a memory 404, processor(s) 406, I/O device(s) 408, a bus 410 and a storage device 412. The choice of processor 406 is not critical as long as a suitable processor with sufficient speed is chosen. In some embodiments, the computing device 400 includes a plurality of processors 406. The memory 404 is able to be any conventional computer memory known in the art. The storage device 412 is able to include a hard drive, CDROM, CDRW, DVD, DVDRW, flash memory card, RAM, ROM, EPROM, EEPROM or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, button interface and other devices. Application(s) 414 are likely to be stored in the storage device 412 and memory 404 and are processed by the processor 406. More or less components shown in FIG. 4 are able to be included in the computing device 400.

The computing device 400 can be a tablet, a mobile phone, a smart phone, a desktop computer, a laptop computer, a netbook, or any suitable computing device such as special purpose devices, including set top boxes and automobile consoles.

The following exemplary scenarios will help demonstrate cloud-based synchronization in accordance with the present invention. Although any number of devices can be synchronized, the first scenario and the second scenario illustrate synching, for the sake of simplicity, between two devices. In particular, the first scenario illustrates synching applications from a mobile device to a computer, and the second scenario illustrates synching applications from the computer to the mobile device. Assume in these scenarios that the user has already created an account in the cloud and has associated the two devices (e.g., mobile device and computer) with the account in the cloud.

Exemplary Scenario 1: Synching Data from a Mobile Device to a Computer

Figure 5A:
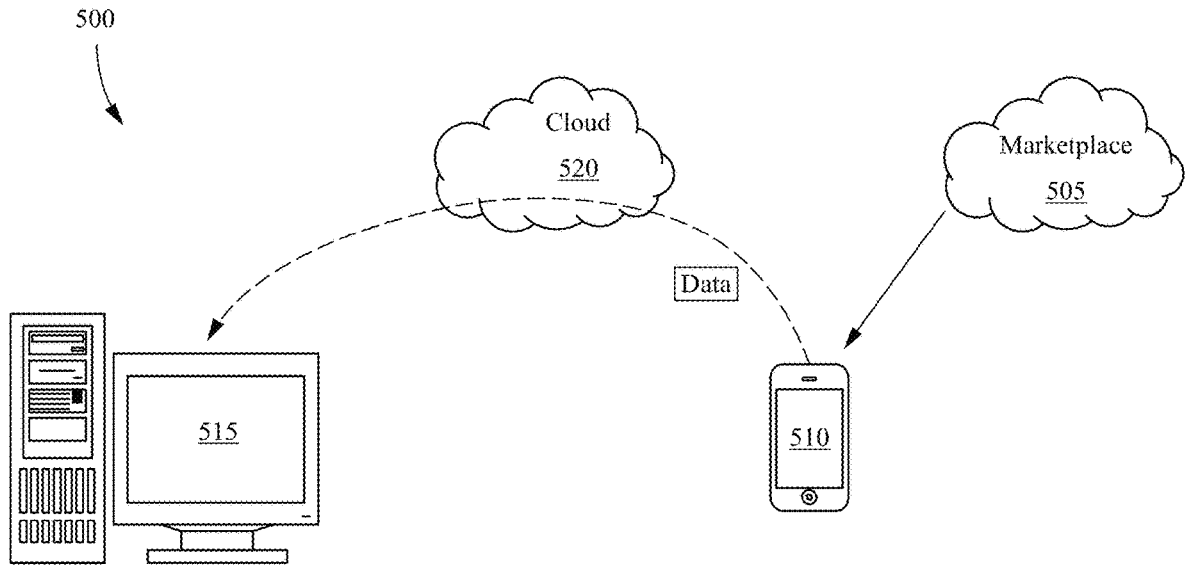
FIG. 5A illustrates an exemplary system for synching data between two devices in accordance with the present invention.

FIG. 5A illustrates an exemplary system 500 for synching data between two devices in accordance with the present invention. The system 500 includes a marketplace 505, a plurality of devices 510, 515, and BlueStacks™ cloud service hosted in a cloud 520. In this example, the plurality of devices includes a mobile device 510 configured as a source device and a computer 515 configured as a target device. Although more devices can be included in the system 500, only the source device 510 and the target device 515 are illustrated for the sake of clarity. In some embodiments, the marketplace 505 is similarly configured as the marketplace 205. The user is able to utilize the marketplace 505 to retrieve applications therefrom onto the source device 510. In some embodiments, the cloud 520 is similarly configured as the cloud 220. The user is able to utilize the cloud service to synch data (e.g., applications) from the mobile device 510 to the computer 515 via the cloud 520.

Figure 5B:
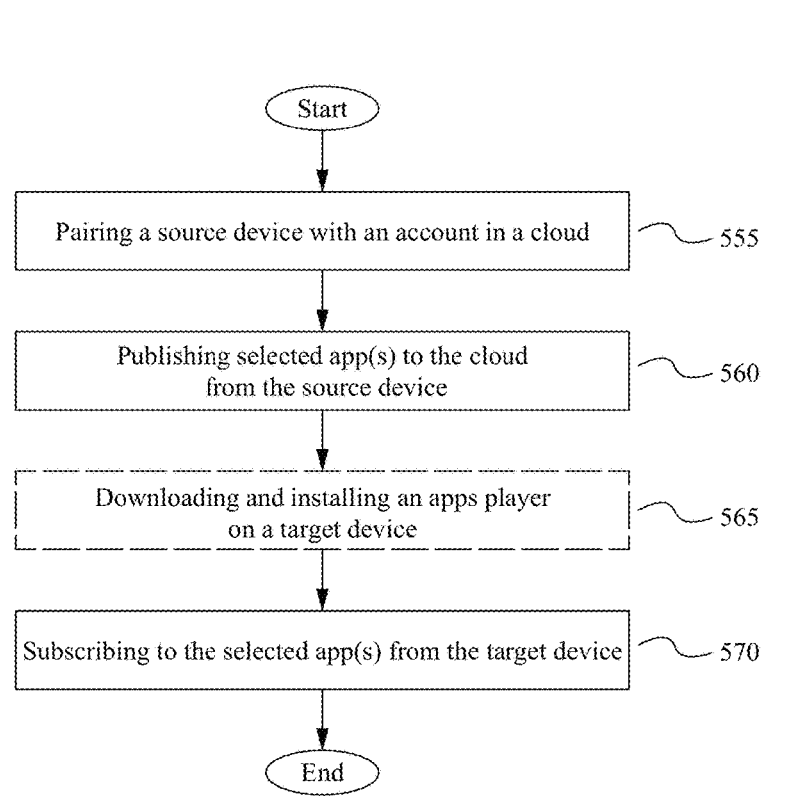
FIG. 5B illustrates an exemplary method for synching applications between two devices of FIG. 5A in accordance with the present invention.
Figure 5C:
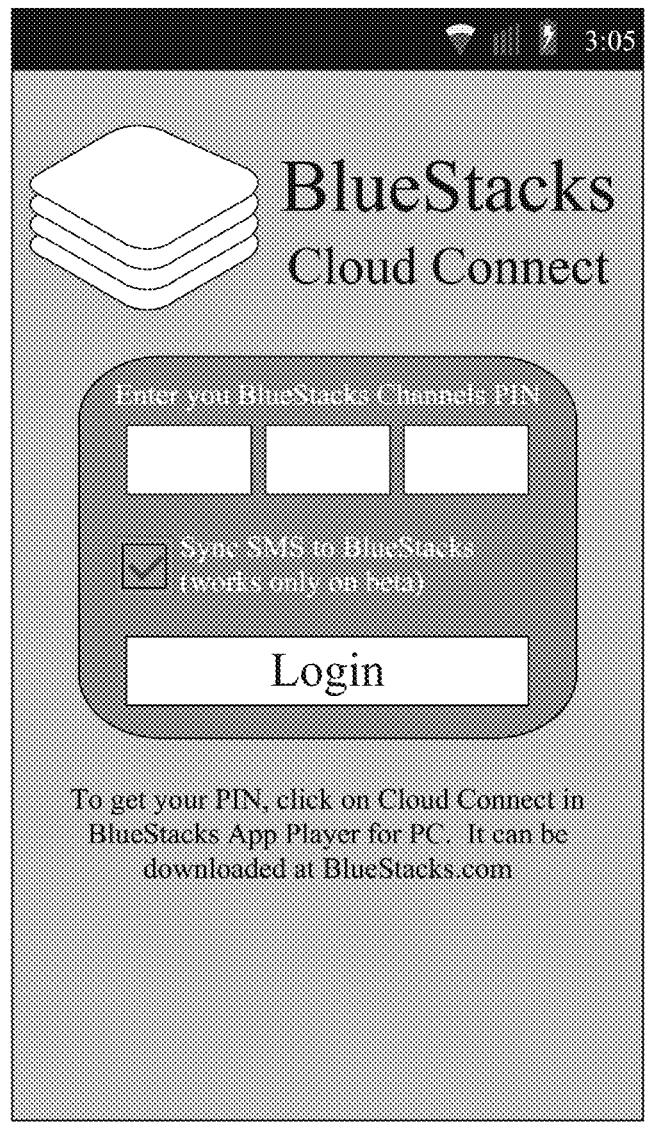
FIGS. 5C-5E illustrate exemplary GUIs of FIG. 5B in accordance with the present invention.

FIG. 5B illustrates an exemplary method 550 for synching applications between the two devices of FIG. 5A in accordance with the present invention. The method 550 begins at a step 555, where the source device (e.g., the mobile device 510 of FIG. 5A) is paired with the account in the cloud. In some embodiments, the source device is paired with the cloud by entering a proper pin in a companion application running on the source device. FIG. 5C illustrates an exemplary GUI interface of the companion application, which allows the user to enter a pin for pairing. Typically, the pin is a unique pin previously generated for the user by the cloud service. Other authentication procedures are contemplated.

Figure 5D:
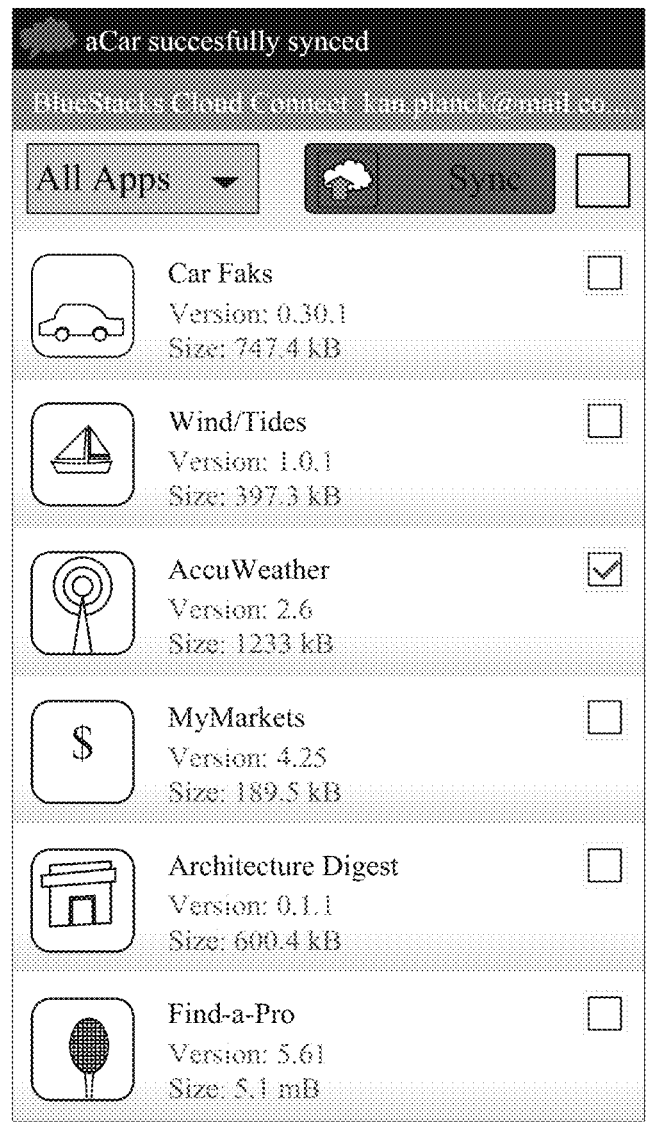
Figure 5E:
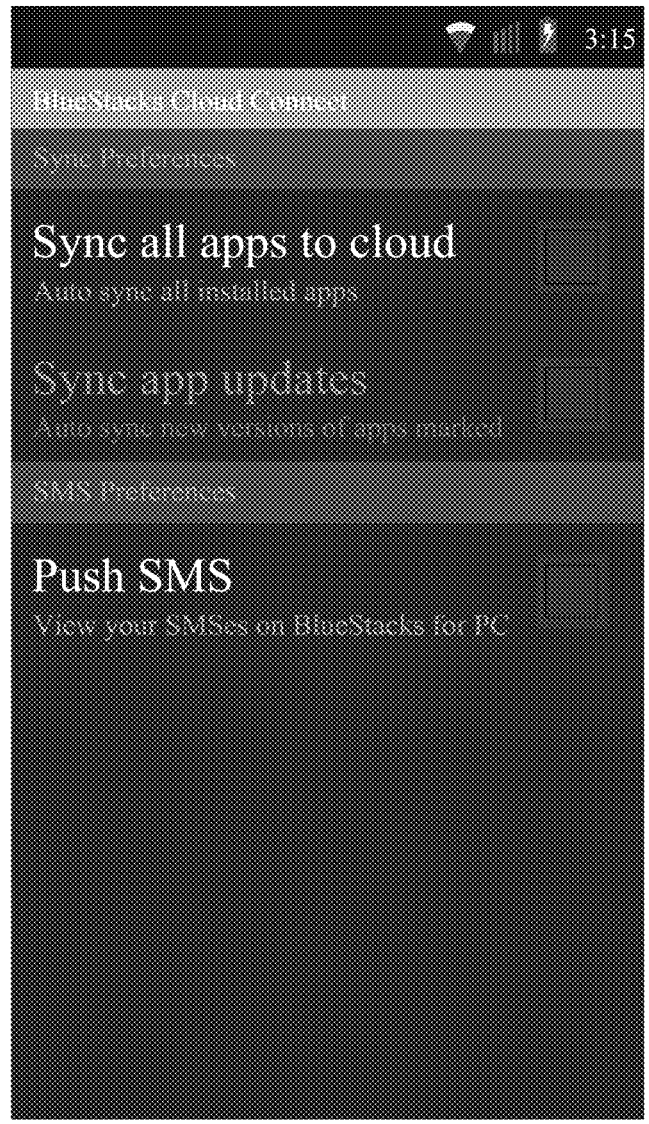

After the source device is paired with the cloud, at a step 560, selected application(s) are published to the cloud from the source device. In some embodiments, the user is able to pick and choose from an applications listing the application(s) to publish to the cloud, as illustrated in FIG. 5D. Alternatively or in addition to, the user is able to concurrently publish all applications to the cloud, as illustrated in FIGS. 5D-5E, by clicking on the appropriate boxes in the companion application. In some embodiments, the user is able to configure which of the devices associated with the account is/are the target device(s) for subscribing to the published application(s). The source device typically remains communicatively coupled with the account during publishing but can become communicatively decoupled after publishing.

In some embodiments, the user is able to configure the companion application on the source device to auto synch all applications, as illustrated in FIG. 5E, upon communicatively coupling with the account. Different techniques can be implemented to perform auto synchronization. One technique is polling. With the polling approach, the companion application periodically checks to see if any new applications or updates are installed on the source device. If there are, those applications and/or updates are published to the cloud. Another technique is hooking into a notification feature provided by the source device. With the hooking approach, the companion application receives notifications from the notification feature. The notification feature typically notifies when a new application or an update has been installed on the source device. If the companion application receives a notification, then the new application and/or update are published to the cloud. Regardless of the technique used, auto synchronization is performed in the background, typically without or with minimal user intervention.

The account in the cloud is typically intelligent; it is able to determine whether a target device, once it is communicatively coupled with the account, has proper dependencies. In other words, the account is configured to determine whether the target device is able to subscribe to the data (e.g., applications) published by the source device. Simply put, the account is configured to determine whether the target device is able to run all the applications published by the source device. In some embodiments, if the target device is not able to run an application, then the target device is not permitted to subscribe to that application until the proper dependencies are satisfied. In some embodiments, proper dependencies can be satisfied by downloading and installing the BlueStacks™ application player.

At an optional step 565, an application player is downloaded and installed on the target device (e.g., the computer 515 of FIG. 5A) to satisfy the proper dependencies. In some embodiments, the account automatically pushes a software program for the application player onto the target device for installation. Typically, the application player supports the same operating system as that supported by the source device. In some embodiments, even if the account determines that the target device does not have the proper dependencies, the target device is able to subscribe to those applications.

At a step 570, the target device, once communicatively coupled with the cloud, subscribes to the selected application(s) from the cloud. In some embodiments, the target device subscribes to these applications even if the target device cannot natively run these applications. In some embodiments, the account is configured to determine where on the target device to download the selected applications to. For example, the applications are downloaded to a specific folder on the target device. For another example, if the source device's operating system is different from the target device's host operating system but is the same as the target device's guest operating system, then the selected applications are automatically stored in the guest environment. In other words, the applications are downloaded in the appropriate operating system supported by the target device for execution. The subscription can be user initiated and/or automatic. In some embodiments, the user is able to select which applications to subscribe to, including those that were published at previous times and/or by other devices associated with the account. Alternatively or in addition to, the target device automatically subscribes to any new or updated applications upon coupling with the cloud. The target device typically remains communicatively coupled with the account during subscription but can become communicatively decoupled after subscription. After the step 570, the method 550 ends.

Exemplary Scenario 2: Synching Data from a Computer to a Mobile Device

Figure 6A:
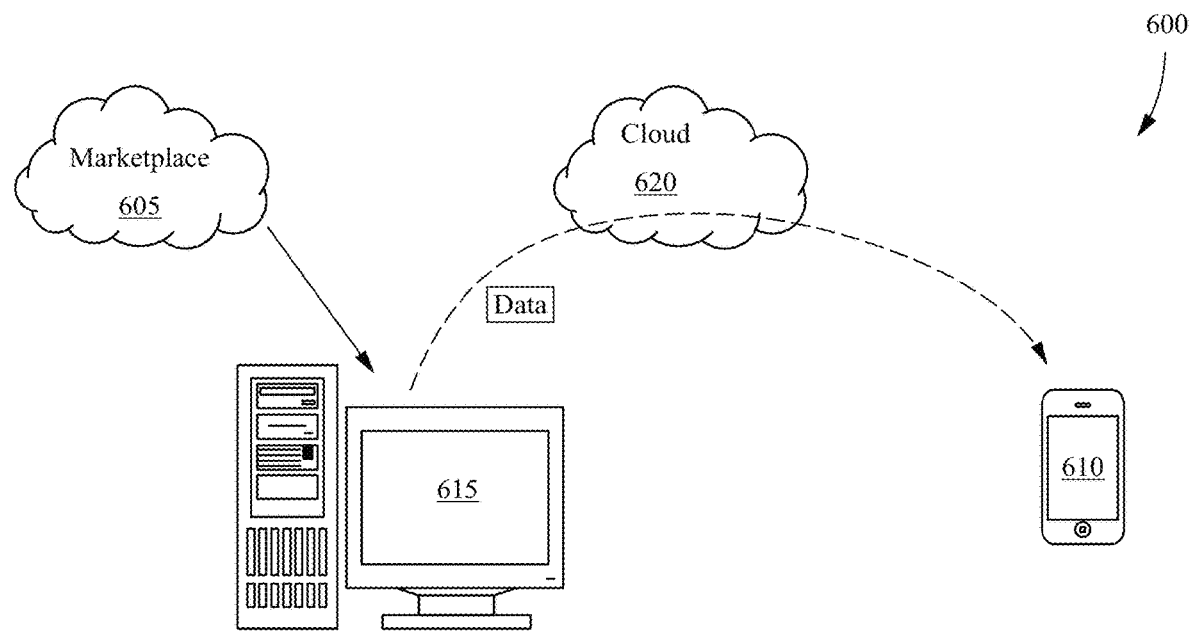
FIG. 6A illustrates another exemplary system for synching data between two devices in accordance with the present invention.

FIG. 6A illustrates another exemplary system 600 for synching data between two devices in accordance with the present invention. The system 600 includes a marketplace 605, a plurality of devices 610, 615, and BlueStacks™ cloud service hosted in a cloud 620. In this example, the plurality of devices includes a mobile device 610 configured as a target device and a computer 615 configured as a source device. Although more devices can be included in the system 600, only the source device 615 and the target device 610 are illustrated for the sake of clarity. In some embodiments, the marketplace 605 is similarly configured as the marketplace 205. The user is able to utilize the marketplace 605 to retrieve applications therefrom. In some embodiments, the user is able to download and install the BlueStacks™ application player, which can be configured as an application broker, on the computer 615. The user is able to search for an application by using the application broker, which is configured as a single interface that accesses one or more marketplaces 605. In some embodiments, the cloud 620 is similarly configured as the cloud 220. The user is able to utilize the cloud service to synch data (e.g., applications) from the computer 615 to the mobile device 610 via the cloud 620.

Figure 6B:
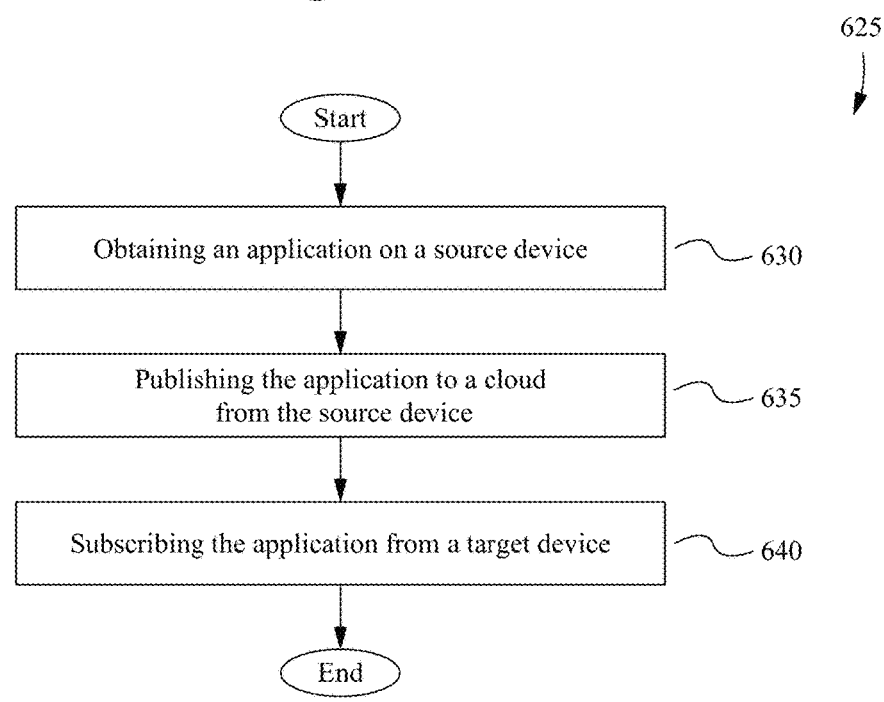
FIG. 6B illustrates an exemplary method for synching applications between two devices of FIG. 6A in accordance with the present invention.

FIG. 6B illustrates an exemplary method 625 for synching applications between the two devices of FIG. 6A in accordance with the present invention. The method 625 begins at a step 630, where the source device (e.g., the computer 615 of FIG. 6A) obtains an application. In some embodiments, the source device obtains the application using the BlueStacks™ application player when configured as an application broker to search for a particular application from one or more marketplaces. The BlueStacks™ application player is typically auto-configured to communicatively couple with the cloud.

At a step 635, the application is published to the cloud from the source device. In some embodiments, the application is published to the cloud via the BlueStacks™ application player. In some embodiments, the user is able to pick and choose from an applications listing the application(s) to publish to the cloud. The applications listing can display applications for only one of the operating systems supported by the source device. The application listing can also display applications for some or all of the operating systems supported by the source device. Alternatively or in addition to, the user is able to concurrently publish all applications to the cloud. In some embodiments, the user is able to configure which of the devices associated with the account is/are the target device(s) for subscribing to the published application(s). The source device typically remains communicatively coupled with the account during publishing but can become communicatively decoupled after publishing.

At a step 640, the target device, once communicatively coupled with the cloud, subscribes to the published application from the cloud. The subscription can be user initiated and/or automatic. In some embodiments, the user is able to select which applications to subscribe to, including those that were published at previous times and/or by other devices associated with the account. Alternatively or in addition to, the target device automatically subscribes to any new or updated applications upon communicatively coupling with the cloud. The target device typically remains communicatively coupled with the account during subscription but can become communicatively decoupled after subscription. After the step 640, the method 625 ends.

In some instances, the user may want to comparison shop for applications on a computer (e.g., source device), because the computer provides a full screen experience and/or the navigation on the computer is easier. Comparison shopping on such a source device allows the user to simultaneously run multiple applications, review details for applications and/or read user application reviews, prior to installing an application on a chosen target device (e.g., mobile device), which may have a more limited screen size as compared to that of the source device.

Figure 6C:
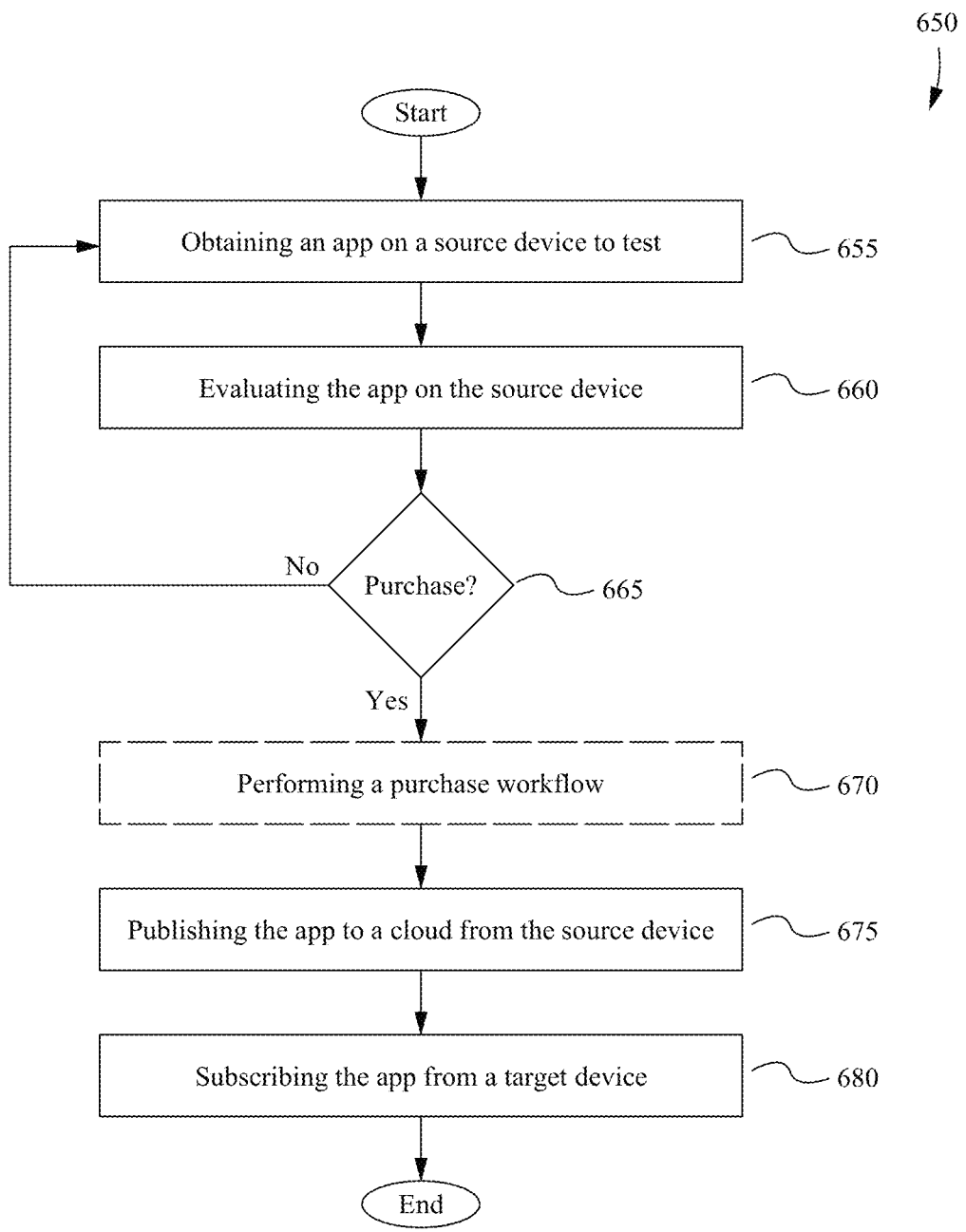
FIG. 6C illustrates an exemplary method of test driving an application in accordance with the present invention.

FIG. 6C illustrates an exemplary method 650 of test driving an application in accordance with the present invention. The method 650 starts with a step 655, where the source device (e.g., the computer 615 of FIG. 6A) obtains an application to test. The step 655 is similar to the step 630.

At a step 660, the application is evaluated on the source device. In some embodiments, in order to test the application on the source device, a suitable virtualization environment is required. The virtualization environment can be provided through the BlueStacks™ application player or by other third party developers. The virtualization environment allows the user to test an otherwise incompatible application on the source device. For example, the user with a Windows PC would require a virtualization environment in order to test Android applications.

At a step 565, a decision is made as to whether the application is to be purchased. If it is determined that the application is not to be purchased, then the method 650 returns to the step 655. If it is determined that the application is to be purchased, then at an optional step 670, a purchase workflow is performed, allowing the user to obtain the application.

At a step 675, the application is published to the cloud from the source device. The step 675 is similar to the step 635.

At a step 680, the target device, once communicatively coupled with the cloud, subscribes to the published application. The step 680 is similar to the step 640. After the step 680, the method 650 ends.

It should be noted that although the examples previously discussed above include a marketplace, the present invention is able to function with other mechanisms of placing applications/data on a source device, such as company managed devices, which have their own software distribution mechanisms. For another example, a user is able to manually download and install software from the Internet.

ADVANTAGES

Embodiments of the present invention allow data to be automatically and transparently synched among two or more devices. The synchronization is effected through a cloud service. The user experience is advantageously seamless. In some embodiments, the cloud service is able to intelligently determine compatibility of data for a target device. For example, the cloud service is able to determine whether the target device is able to execute a published application, and to prevent the target device from subscribing to the published application until proper dependencies are fulfilled on the target device.

Embodiments of the present invention advantageously allow a user to shop for applications on a source device prior to installing the application on a target device, perhaps because the source device provides a better ability to make purchasing decisions.

Embodiments of the present invention advantageously allow a user to store data with the cloud service, for example, when the user needs additional storage space on the source device or, for another example, the user needs to reinstall/reconfigure the source device by temporarily removing the data from the source device but without permanently losing such data.

Embodiments of the present invention advantageously allow a user to access SMS messages on a work computer (e.g., target device) via the cloud that were sent to a mobile device (e.g., source device). This is particularly useful when the user, for example, had forgotten the mobile device at home.

Embodiments of the present invention advantageously allow the user to decide that the user no longer wants to play a game on a computer (e.g., source device) but rather on a mobile device (e.g., target device) so that the user is able to play the game on the bus to and from work.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A non-transitory computer-readable medium storing instructions that, when executed by a computing device, cause the computing device to perform a method comprising:
   a. creating a user account in a cloud;
   b. pairing with the user account, a secondary publishing device that is associated with and is configured for pairing with the user account in the cloud;
   c. managing publishing and subscription relationships between a primary subscribing device and the secondary publishing device, wherein the primary subscribing device is associated with and is configured for pairing with the user account in the cloud, wherein the primary subscribing device has a first type of operating system implemented thereon and the secondary publishing device has a second type of operating system implemented thereon different from the first type of operating system, and wherein managing publishing and subscription relationships between the primary subscribing device and the secondary publishing device comprises configuring the primary subscribing device to execute data that is published by the secondary publishing device to the user account in the cloud, said publishing of the data by the secondary publishing device being implemented while said secondary publishing device is paired with the user account in the cloud, said configuring comprising:
      (i) checking whether the primary subscribing device includes installed thereon an application player that supports the second type of operating system that is implemented on the secondary publishing device, wherein said application player is configured to run an application published by the secondary publishing device to the user account in the cloud, such that the data published by the secondary publishing device to the user account in the cloud is executable on the primary subscribing device, and
      (ii) responsive to a determination that the primary subscribing device does not have installed thereon the application player that supports the second type of operating system,
      preventing the primary subscribing device from subscribing to the data published by the secondary publishing device to the user account in the cloud until the primary subscribing device has installed thereon, the application player that supports the second type of operating system;
      automatically pushing the application player from the user account to the primary subscribing device for installation on the primary subscribing device, such that the data published by the secondary publishing device is retrieved from the user account and stored in a guest operating system associated with the application player while the primary subscribing device is paired with the user account in the cloud, wherein the guest operating system includes the second type of operating system, and
      enabling the primary subscribing device to subscribe to the data published by the secondary publishing device to the user account in the cloud, subsequent to the application player being installed on the primary subscribing device.

2. The non-transitory computer-readable medium of claim 1, wherein managing publishing and subscription relationships includes synching data between the primary subscribing device and the secondary publishing device.

3. The non-transitory computer-readable medium of claim 2, wherein synching data includes publishing data from one of the primary subscribing device and the secondary publishing device, and subscribing to the data from the other device.

4. The non-transitory computer-readable medium of claim 1, wherein the secondary publishing device is paired with the user account via a shared secret.

5. The non-transitory computer-readable medium of claim 1, wherein the secondary publishing device is paired with the user account via public key cryptography.

6. A method of synching two devices associated with a user account in a cloud, the method comprising:
   a. pairing with the user account, a source device that is associated with and configured for pairing with the user account in the cloud, and publishing data to the user account in the cloud from a source device while the source device is communicatively coupled with the user account in the cloud;
   b. configuring a target device to execute data published by the source device to the user account in the cloud, wherein the target device has a first type of operating system implemented thereon and the source device has a second type of operating system implemented thereon different than the first type of operating system, wherein said configuring of the target device comprises:
      (i) checking whether the target device includes installed thereon an application player that supports the second type of operating system that is implemented on the source device, wherein said application player is configured to run an application published by the source device to the user account in the cloud, such that the data published by the source device to the user account in the cloud is executable on the target device,
      (ii) responsive to a determination that the target device does not have installed thereon the application player that supports the second type of operating system that is implemented on the source device,
      preventing the target device from subscribing to the data published by the source device to the user account in the cloud until the target device has installed thereon, the application player that supports the second type of operating system;
      pushing the application player to the target device for installation on the target device while the target device is paired with the user account in the cloud, and
      enabling the target to subscribe to the data published by the source device to the user account in the cloud, subsequent to the application player being installed on the target device; and
      (iii) responsive to a determination that the target device has installed thereon the application player that supports the second type of operating system that is implemented on the source device, subscribing from the target device to the data published by the source device to the user account in the cloud, while the target device is communicatively coupled with the user account in the cloud.

7. The method of claim 6, wherein at least one of the source device and the target device supports a guest operating system.

8. The method of claim 6, wherein the data published by the source device to the user account in the cloud includes at least one of an application, a phone book, a calendar, SMS messages, email, memos, a photo/video album, documents and folders.

9. The method of claim 6, further comprising:
   a. pairing the source device with the user account in the cloud;
   b. publishing one or more selected applications to the user account in the cloud from the source device; and
   c. subscribing from the target device to the one or more selected applications published from the source device to the user account in the cloud.

10. The method of claim 9, wherein subscribing to the one or more applications published by the source device to the user account in the cloud includes downloading the one or more applications in an appropriate operating system supported by the target device.

11. The method of claim 10, wherein the one or more applications published by the source device to the user account in the cloud are automatically downloaded in an appropriate operating system.

12. The method of claim 6, further comprising:
   a. obtaining an application on the source device;
   b. publishing the application to the cloud from the source device via the application player that is on the source device; and
   c. subscribing from the source device to the application published to the cloud from the source device.

13. The method of claim 12, wherein obtaining an application includes using an application broker configured to interface with at least one application source to retrieve the application therefrom, wherein the application player that is on the source device includes the application broker.

14. The method of claim 12, wherein the application is specific to a guest operating system, wherein the application is configured to run in the application player that is associated with the guest operating system but the application is not configured to run in a host operating system of the source device, wherein the application player is executed on the source device.

15. The method of claim 13, further comprising receiving by the application broker information regarding applications from a plurality of remote marketplaces, wherein at least a first portion of the applications is compatible with a guest operating system of the source device but is not compatible with a host operating system of the source device.

16. The method of claim 15, wherein at least a second portion of the applications is compatible with the host operating system of the source device.

17. The method of claim 14, wherein the application player is auto-configured to communicatively couple with the cloud.

18. The method of claim 12, wherein subscribing to the application includes pairing the target device with the user account in the cloud.

19. The method of claim 12, further comprising, before publishing the application:
   a. evaluating the application on the source device, wherein the application is not compatible with a native operating system of the source device; and
   b. performing a purchase workflow to buy the application.

20. A system for synching a plurality of devices, the system comprising:
   a. a plurality of devices, each configured to communicatively couple with a cloud, wherein at least one first device of the plurality of devices has a first type of operating system implemented thereon, wherein at least one second device of the plurality of devices has a second type of operating system implemented thereon different than the first type of operating system; and
   b. a server communicatively coupled with the cloud and providing a service including maintaining a user account in the cloud, wherein at least a portion of the plurality of devices including the at least one first device and the at least one second device are associated with and are configured for pairing with the user account in the cloud, and including managing publishing and subscription relationships between the associated devices, wherein the management includes configuring the at least one first device having the first type of operating system implemented thereon to execute data published by the at least one second device to the user account in the cloud, said publishing of the data by the at least one second device being implemented while said at least one second device is paired with the user account in the cloud, said configuring comprising:
      (i) checking whether the at least one first device having the first type of operating system implemented thereon includes installed thereon an application player that supports the second type of operating system that the data is compatible with such that the data is executable on the at least one first device having the first type of operating system implemented thereon, and
      (ii) responsive to determining that the application player is not installed on the at least one first device having the first type of operating system implemented thereon,
      preventing the at least one first device from subscribing to the data published by the at least one second device to the user account in the cloud until the at least one first device has installed thereon, the application player that supports the second type of operating system;
      pushing the application player to the at least one first device having the first type of operating system implemented thereon for installation on the at least one first device having the first type of operating system implemented thereon, while the at least one first device is paired with the user account in the cloud; and
      enabling the at least one first device to subscribe to the data published by the at least one second device to the user account in the cloud, subsequent to the application player being installed on the at least one first device.

21. The system of claim 20, wherein at least one of the associated devices is configured to support a host operating system and a guest operating system.

22. The system of claim 20, wherein at least one of the associated devices is configured to communicatively couple with an application marketplace via a corresponding application player installed thereon.

23. The system of claim 20, wherein the user account is configured to prevent one of the associated devices from subscribing applications upon determining that the one associated device does not have the application player installed thereon.

24. The system of claim 20, wherein the user account is configured to allow the at least one first device of the associated devices to publish an application to the cloud and the at least one second device of the associated devices to subscribe to the application from the cloud.

25. The system of claim 24, wherein the at least one second device has the application player installed thereon.

26. The system of claim 20, wherein the user account is configured to properly manage rights for applications.

27. The method of claim 15, further comprising displaying a refined results list in the application broker, wherein the refined results list is determined by excluding duplicate entries from the information that represent application from two or more of the remote marketplaces such that each of the applications is represented only as a single entry in the refined results list.

* * * * *